United States Patent
Li et al.

(10) Patent No.: US 10,484,088 B2
(45) Date of Patent: Nov. 19, 2019

(54) APPARATUS AND METHOD FOR MONITORING OPTICAL PERFORMANCE PARAMETER, AND OPTICAL TRANSMISSION SYSTEM

(71) Applicant: Huawei Technologies Co., Ltd., Shenzhen (CN)

(72) Inventors: Zhaohui Li, Guangzhou (CN); Jianping Li, Guangzhou (CN); Dawei Wang, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 61 days.

(21) Appl. No.: 15/277,802

(22) Filed: Sep. 27, 2016

(65) Prior Publication Data
US 2017/0019173 A1    Jan. 19, 2017

Related U.S. Application Data

(63) Continuation of application No. PCT/CN2014/074184, filed on Mar. 27, 2014.

(51) Int. Cl.
*H04B 10/079*    (2013.01)
*H04B 10/50*    (2013.01)
*H04B 10/61*    (2013.01)

(52) U.S. Cl.
CPC ....... *H04B 10/0795* (2013.01); *H04B 10/503* (2013.01); *H04B 10/61* (2013.01)

(58) Field of Classification Search
CPC .......... H04B 10/0795; H04B 10/07953; H04B 10/0775; H04B 10/503; H04B 10/61
(Continued)

(56) References Cited

U.S. PATENT DOCUMENTS 7,356,256 B1 * 4/2008 Strawczynski ...... H04B 10/077
                                                    398/189
7,418,212 B1 * 8/2008 Bontu ................... H04L 25/061
                                                    375/232
(Continued)

FOREIGN PATENT DOCUMENTS

CN    101917233 A    12/2010
CN    102215079 A    10/2011
(Continued)

OTHER PUBLICATIONS

Chen et al; Optical performance monitoring for OFDM using low bandwidth coherent receivers; Dec. 2012; OSA; pp. 28724-28733.*

*Primary Examiner* — Amritbir K Sandhu
(74) *Attorney, Agent, or Firm* — Leydig, Voit & Mayer, Ltd.

(57) ABSTRACT

The present invention discloses an apparatus. The apparatus includes: a coherent receiving unit, configured to perform coherent synthesis on a received to-be-detected optical signal and a multi-wavelength local oscillation laser beam, and convert a coherent receiving signal formed by means of the coherent synthesis into an analog electrical signal; a data acquiring unit, configured to acquire the analog electrical signal output by the coherent receiving unit, and convert the analog electrical signal into a digital signal; a power spectrum generation unit, configured to process the digital signal output by the data acquiring unit, to generate a continuous full power spectrum of the to-be-detected optical signal; and an optical performance parameter monitoring unit, configured to monitor, according to the continuous full power spectrum generated by the power spectrum generation unit, an optical performance parameter of a transmission link carrying the to-be-detected optical signal.

18 Claims, 5 Drawing Sheets

(58) Field of Classification Search
USPC .................................................... 398/25–33
See application file for complete search history.

(56) References Cited

U.S. PATENT DOCUMENTS

| | | | | |
|---|---|---|---|---|
| 7,650,071 B2* | 1/2010 | Hotta | ................ | H04B 10/0799 398/155 |
| 9,184,864 B2* | 11/2015 | Osaka | ................ | H04J 14/02 |
| 9,391,731 B2* | 7/2016 | Jia | ................ | H04J 14/02 |
| 9,608,722 B2* | 3/2017 | Liu | ................ | H04B 10/07951 |
| 9,853,734 B1* | 12/2017 | Fan | ................ | H04B 10/40 |
| 2006/0198397 A1 | 9/2006 | Korolev et al. | | |
| 2007/0036548 A1* | 2/2007 | Duan | ................ | H04B 10/07953 398/83 |
| 2007/0133918 A1* | 6/2007 | Cho | ................ | G02F 1/225 385/1 |
| 2010/0054759 A1* | 3/2010 | Oda | ................ | H04B 10/6971 398/202 |
| 2010/0092168 A1* | 4/2010 | Li | ................ | H04B 10/0795 398/16 |
| 2010/0098411 A1* | 4/2010 | Nakashima | ................ | H04B 10/60 398/25 |
| 2010/0189445 A1* | 7/2010 | Nakashima | ................ | H04B 10/60 398/152 |
| 2011/0168776 A1 | 7/2011 | Jalali et al. | | |
| 2012/0057863 A1* | 3/2012 | Winzer | ................ | H04B 10/60 398/3 |
| 2012/0087680 A1 | 4/2012 | Xie | | |
| 2012/0148235 A1 | 6/2012 | Nishihara et al. | | |
| 2012/0189308 A1 | 7/2012 | Watanabe | | |
| 2012/0219293 A1* | 8/2012 | Boertjes | ................ | H04J 14/0204 398/48 |
| 2012/0224865 A1* | 9/2012 | Brown | ................ | H04B 10/63 398/183 |
| 2012/0237202 A1 | 9/2012 | Abe et al. | | |
| 2013/0028595 A1 | 1/2013 | Nakagawa et al. | | |
| 2013/0058650 A1* | 3/2013 | Bouda | ................ | H04J 14/0212 398/48 |
| 2013/0070254 A1* | 3/2013 | Winzer | ................ | H04J 14/02 356/478 |
| 2013/0170829 A1* | 7/2013 | Khatana | ................ | H04B 10/6165 398/27 |
| 2013/0216240 A1* | 8/2013 | Fukuchi | ................ | H04B 10/6161 398/208 |
| 2013/0266308 A1* | 10/2013 | Fukuchi | ................ | H04B 10/616 398/16 |
| 2014/0064723 A1* | 3/2014 | Adles | ................ | H04B 10/616 398/25 |
| 2014/0193152 A1* | 7/2014 | Zhou | ................ | H04B 10/614 398/72 |
| 2014/0286651 A1* | 9/2014 | Takechi | ................ | H04B 10/614 398/208 |
| 2015/0098713 A1 | 4/2015 | Abe et al. | | |
| 2015/0229410 A1* | 8/2015 | Magri | ................ | H04B 10/25133 398/26 |
| 2015/0304025 A1* | 10/2015 | Liu | ................ | H04B 10/07951 398/28 |
| 2016/0094292 A1* | 3/2016 | Mochizuki | ................ | H04B 10/6165 398/208 |
| 2016/0112155 A1* | 4/2016 | Koga | ................ | H04B 10/07953 398/25 |
| 2016/0127037 A1* | 5/2016 | Cavaliere | ................ | H04L 1/005 |
| 2016/0164599 A1* | 6/2016 | Heismann | ................ | H04B 10/07953 398/26 |
| 2016/0269110 A1* | 9/2016 | Dahan | ................ | H04B 10/0793 |
| 2017/0019173 A1* | 1/2017 | Li | ................ | H04B 10/0795 |
| 2017/0048002 A1* | 2/2017 | Li | ................ | H04B 10/00 |
| 2018/0227058 A1* | 8/2018 | Han | ................ | H04B 10/40 |

FOREIGN PATENT DOCUMENTS

| | | | |
|---|---|---|---|
| CN | 102439877 A | | 5/2012 |
| CN | 102571200 A | * | 7/2012 |
| CN | 102638302 A | | 8/2012 |
| CN | 102820932 A | | 12/2012 |
| CN | 102882606 A | | 1/2013 |
| CN | 102971968 A | | 3/2013 |
| CN | 103312645 A | | 9/2013 |
| CN | 103339882 A | | 10/2013 |
| CN | 203299665 U | | 11/2013 |
| CN | 102594447 B | | 2/2017 |
| EP | 1933478 A1 | | 6/2008 |
| EP | 2637323 A1 | | 9/2013 |
| JP | 2010034891 A | | 2/2010 |
| JP | 2010504694 A | | 2/2010 |
| JP | 2012129656 A | | 7/2012 |
| JP | 2012515468 A | | 7/2012 |
| WO | 2008036356 A1 | | 3/2008 |
| WO | 2010080721 A1 | | 7/2010 |
| WO | 2011052075 A1 | | 5/2011 |

* cited by examiner

FIG. 10

APPARATUS AND METHOD FOR MONITORING OPTICAL PERFORMANCE PARAMETER, AND OPTICAL TRANSMISSION SYSTEM

CROSS-REFERENCE TO RELATED APPLICATIONS

This application is a continuation of International Application No. PCT/CN2014/074184, filed on Mar. 27, 2014, the disclosure of which is hereby incorporated by reference in its entirety.

TECHNICAL FIELD

The present invention relates to the field of optical networks, and in particular, to an apparatus and a method for monitoring an optical performance parameter, and an optical transmission system in the field of optical networks.

BACKGROUND

Driven by application services that are based on multimedia network technologies, with requirements of people on bandwidth, a transmission capacity of a communications network increases dramatically. Because a conventional electrical network cannot provide a low-cost solution for a high-capacity communications network, a bottleneck of network bandwidth is shifted from an optical layer of a network to a network layer. Therefore, a dynamic, transparent, and reconfigurable optical network attracts more attention of people and develops rapidly.

The optical network is developed not only in terms of continuous improvement of a transmission rate, intelligence of the optical network is also continuously improved. Intelligent management requires that a state and a signal of a network need to be monitored in real time, thereby performing dynamic control. Therefore, it is quite necessary to determine a parameter and a state of health of a network physical layer in an optical domain. Optical performance monitor (OPM), as a function module for monitoring indicators such as optical power of a channel, a center wavelength, and an optical signal-to-noise ratio (OSNR) online (in the optical domain), has attracted attention of people. The optical performance monitor can provide reliable, accurate, and real-time information for the optical network, and has become an important link of optical network management.

Currently, an OPM module monitors an optical performance parameter mainly based on an optical spectrum analysis technology, that is, the OPM module generally uses a tunable filter and a homodyne detection technology to extract an optical spectrum characteristic to monitor multiple parameters. The tunable filter needs to filter out each single-wavelength optical signal, and monitors each single-wavelength optical signal, so as to estimate the optical performance parameter.

However, because the filter used by the OPM module causes severe damage to a signal, precision of detecting the optical performance parameter by the OPM module is relatively low.

SUMMARY

Embodiments of the present invention provide an apparatus and a method for monitoring an optical performance parameter, and an optical transmission system, which can monitor an optical performance parameter with high precision.

According to a first aspect, an apparatus for monitoring an optical performance parameter is provided, where the apparatus includes: a coherent receiving unit, configured to perform coherent synthesis on a received to-be-detected optical signal and a multi-wavelength local oscillation laser beam, and convert a coherent receiving signal formed by means of the coherent synthesis into an analog electrical signal; a data acquiring unit, configured to acquire the analog electrical signal output by the coherent receiving unit, and convert the analog electrical signal into a digital signal; a power spectrum generation unit, configured to process the digital signal output by the data acquiring unit, to generate a continuous full power spectrum of the to-be-detected optical signal; and an optical performance parameter monitoring unit, configured to monitor, according to the continuous full power spectrum generated by the power spectrum generation unit, an optical performance parameter of a transmission link carrying the to-be-detected optical signal.

With reference to the first aspect, in a first possible implementation manner of the first aspect, the coherent receiving unit includes: a multi-wavelength local oscillation laser, configured to output the multi-wavelength local oscillation laser beam; a first optical synthesizer, configured to perform coherent synthesis on a first to-be-detected optical signal that has a first polarization state and that is in the to-be-detected optical signal and a first local oscillation laser beam that has the first polarization state and that is in the multi-wavelength local oscillation laser beam; and a first optoelectronic detector, configured to receive the coherent receiving signal generated after the first optical synthesizer performs the coherent synthesis, and convert the coherent receiving signal into the analog electrical signal.

With reference to the first possible implementation manner of the first aspect, in a second possible implementation manner of the first aspect, the coherent receiving unit further includes: a polarization controller, configured to adjust a polarization state of the received to-be-detected optical signal; a first polarization beam splitter, configured to divide, into the first to-be-detected optical signal and a second to-be-detected optical signal whose polarization states are perpendicular to each other, the to-be-detected optical signal output by the polarization controller, where the first to-be-detected optical signal is input to the first optical synthesizer; and a second polarization beam splitter, configured to divide, into the first local oscillation laser beam and a second local oscillation laser beam whose polarization states are perpendicular to each other, the multi-wavelength local oscillation laser beam that is output by the multi-wavelength local oscillation laser, where the first local oscillation laser beam is input to the first optical synthesizer.

With reference to the second possible implementation manner of the first aspect, in a third possible implementation manner of the first aspect, the coherent receiving unit further includes: a second optical synthesizer, configured to receive the second to-be-detected optical signal that has a second polarization state and the second local oscillation laser beam that has the second polarization state, and perform coherent synthesis on the second to-be-detected optical signal and the second local oscillation laser beam, where the second polarization state is perpendicular to the first polarization state; and a second optoelectronic detector, configured to receive the coherent receiving signal generated after the second optical synthesizer performs the coherent synthesis, and convert the coherent receiving signal into the analog electrical signal.

With reference to the first aspect or any possible implementation manner of the first to third possible implementation manners of the first aspect, in a fourth possible implementation manner of the first aspect, the power spectrum generation unit includes: a Fourier transform module, configured to perform Fourier transformation on the digital signal output by the data acquiring unit, to generate continuous power spectra, in multiple different frequency bands corresponding to the multi-wavelength local oscillation laser beam, of the to-be-detected optical signal; a spectrum splicing module, configured to generate a discrete full power spectrum of the to-be-detected optical signal according to the continuous power spectra in the multiple different frequency bands; and a spectrum generation module, configured to generate the continuous full power spectrum of the to-be-detected optical signal according to the discrete full power spectrum of the to-be-detected optical signal by using an interpolation algorithm.

With reference to the fourth possible implementation manner of the first aspect, in a fifth possible implementation manner of the first aspect, the Fourier transform module is specifically configured to: perform averaging processing on multiple digital signals that are output by the data acquiring unit and that are in a same frequency band; and perform Fourier transformation on the digital signals on which the averaging processing has been performed, to generate a continuous power spectrum, in the same frequency band corresponding to the multi-wavelength local oscillation laser beam, of the to-be-detected optical signal.

With reference to any possible implementation manner of the first to fifth possible implementation manners of the first aspect, in a sixth possible implementation manner of the first aspect, the multi-wavelength local oscillation laser is a tunable laser, and a wavelength of a laser beam that is output by the tunable laser includes a wavelength of the to-be-detected optical signal.

With reference to any possible implementation manner of the first to fifth possible implementation manners of the first aspect, in a seventh possible implementation manner of the first aspect, the multi-wavelength local oscillation laser is an optical frequency comb; and the coherent receiving unit further includes: a band-pass filter BPF, configured to perform filtering on the multi-wavelength local oscillation laser beam that is output by the optical frequency comb, where a frequency of the to-be-detected optical signal is within a range of cut-off frequencies of the band-pass filter.

With reference to any possible implementation manner of the third to seventh possible implementation manners of the first aspect, in an eighth possible implementation manner of the first aspect, the first optical synthesizer or the second optical synthesizer is an optical hybrid, and a bandwidth of the first optoelectronic detector or the second optoelectronic detector is within a range of 500 MHz to 2 GHz.

With reference to any possible implementation manner of the third to seventh possible implementation manners of the first aspect, in a ninth possible implementation manner of the first aspect, the first optical synthesizer or the second optical synthesizer is an optical coupler.

With reference to the first aspect or any possible implementation manner of the first to ninth possible implementation manners of the first aspect, in a tenth possible implementation manner of the first aspect, the optical performance parameter monitored by the optical performance parameter monitoring unit includes at least one parameter of the following parameters: an optical signal-to-noise ratio OSNR, optical power, a modulation format, a channel wavelength shift, amplified spontaneous emission ASE noise, an amplifier gain, and a gain tilt.

According to a second aspect, a method for monitoring an optical performance parameter is provided, where the method includes: performing coherent synthesis on a received to-be-detected optical signal and a multi-wavelength local oscillation laser beam; converting a coherent receiving signal formed by means of the coherent synthesis into an analog electrical signal; acquiring the analog electrical signal, and converting the analog electrical signal into a digital signal; processing the digital signal, to generate a continuous full power spectrum of the to-be-detected optical signal; and monitoring, according to the continuous full power spectrum, an optical performance parameter of a transmission link carrying the to-be-detected optical signal.

With reference to the second aspect, in a first possible implementation manner of the second aspect, the performing coherent synthesis on a received to-be-detected optical signal and a multi-wavelength local oscillation laser beam includes: performing coherent synthesis on a first to-be-detected optical signal that has a first polarization state and that is in the to-be-detected optical signal and a first local oscillation laser beam that has the first polarization state and that is in the multi-wavelength local oscillation laser beam.

With reference to the first possible implementation manner of the second aspect, in a second possible implementation manner of the second aspect, before the performing coherent synthesis on a received to-be-detected optical signal and a multi-wavelength local oscillation laser beam, the method further includes: adjusting a polarization state of the received to-be-detected optical signal; dividing, into the first to-be-detected optical signal and a second to-be-detected optical signal whose polarization states are perpendicular to each other, the to-be-detected optical signal whose polarization state is adjusted; and dividing the multi-wavelength local oscillation laser beam into the first local oscillation laser beam and a second local oscillation laser beam whose polarization states are perpendicular to each other, where the performing coherent synthesis on a received to-be-detected optical signal and a multi-wavelength local oscillation laser beam includes: performing coherent synthesis on the first to-be-detected optical signal and the first local oscillation laser beam.

With reference to the second possible implementation manner of the second aspect, in a third possible implementation manner of the second aspect, the performing coherent synthesis on a received to-be-detected optical signal and a multi-wavelength local oscillation laser beam includes: performing coherent synthesis on the first to-be-detected optical signal and the first local oscillation laser beam; and performing coherent synthesis on the second to-be-detected optical signal that has a second polarization state and the second local oscillation laser beam that has the second polarization state, where the second polarization state is perpendicular to the first polarization state.

With reference to the second aspect or any possible implementation manner of the first to third possible implementation manners of the second aspect, in a fourth possible implementation manner of the second aspect, the processing the digital signal, to generate a continuous full power spectrum of the to-be-detected optical signal includes: performing Fourier transformation on the digital signal, to generate continuous power spectra, in multiple different frequency bands corresponding to the multi-wavelength local oscillation laser beam, of the to-be-detected optical signal; generating a discrete full power spectrum of the to-be-detected optical signal according to the continuous power spectra in the multiple different frequency bands; and generating the continuous full power spectrum of the to-be-detected optical signal according to the discrete full power spectrum of the to-be-detected optical signal by using an interpolation algorithm.

According to a third aspect, an optical transmission system is provided, where the optical transmission system includes: a fiber link, configured to transmit an optical signal; an optical splitter, disposed in the fiber link, and configured to divide the optical signal into a first optical signal and a second optical signal, where a strength of the first optical signal is greater than a strength of the second optical signal; and the apparatus for monitoring an optical performance parameter according to the embodiments of the present invention, configured to receive the second optical signal output by the optical splitter, and monitor an optical performance parameter of the second optical signal, where the apparatus includes: a coherent receiving unit, configured to perform coherent synthesis on a received to-be-detected optical signal and a multi-wavelength local oscillation laser beam, and convert a coherent receiving signal formed by means of the coherent synthesis into an analog electrical signal; a data acquiring unit, configured to acquire the analog electrical signal output by the coherent receiving unit, and convert the analog electrical signal into a digital signal; a power spectrum generation unit, configured to process the digital signal output by the data acquiring unit, to generate a continuous full power spectrum of the to-be-detected optical signal; and an optical performance parameter monitoring unit, configured to monitor, according to the continuous full power spectrum generated by the power spectrum generation unit, an optical performance parameter of a transmission link carrying the to-be-detected optical signal.

Based on the foregoing technical solutions, according to the apparatus and the method for monitoring an optical performance parameter, and the optical transmission system in the embodiments of the present invention, coherent synthesis is performed on a received to-be-detected optical signal and a multi-wavelength local oscillation laser beam, and corresponding signal processing is performed to generate a continuous full power spectrum of the to-be-detected optical signal, so that an optical performance parameter of a transmission link carrying the to-be-detected optical signal can be monitored according to the continuous full power spectrum, which can prevent damage to a signal caused when a filter is used, thereby monitoring an optical performance parameter with high precision.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various optical networks, and especially to a passive optical network (PON), for example, a gigabit-capable passive optical network (GPON) system, a 10 Gbit/s Ethernet passive optical network (10G EPON), and a 10-Gigabit-capable passive optical network (XG PON). In addition, for ease of description, a PON system is used as an example for description below, but the present invention is not limited thereto.

Figure 1:
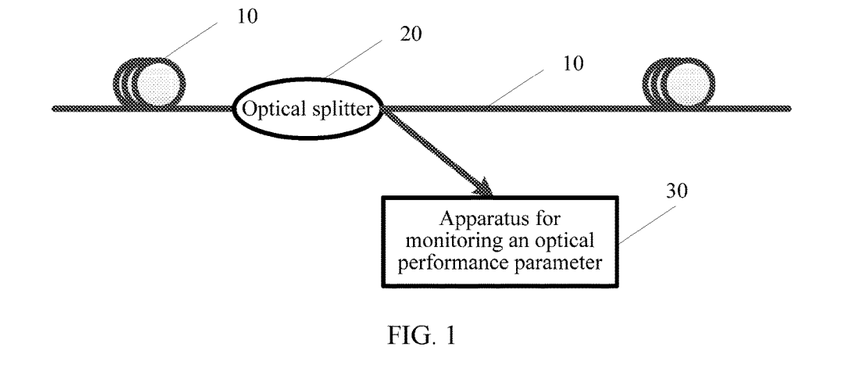
FIG. 1 is a schematic block diagram of an application scenario according to an embodiment of the present invention.

FIG. 1 shows a schematic block diagram of an application scenario according to an embodiment of the present invention. As shown in FIG. 1, in an optical transmission system, for example, in a PON system, the PON system may include a fiber link 10 configured to transmit an optical signal, and an optical splitter 20 disposed in the fiber link 10, where the optical splitter 20 may divide an optical signal transmitted in the fiber link 10 into two optical signals, where one of the optical signals may continue to be transmitted in the fiber link 10, and the other optical signal may be input to an apparatus 30 for monitoring an optical performance parameter, so as to monitor an optical performance parameter of a transmission link carrying the optical signal, where the apparatus 30 is, for example, an OPM module or an apparatus for monitoring an optical performance parameter according to an embodiment of the present invention.

It should be understood that, the optical signal transmitted by the fiber link may not only be used to carry data that is transmitted in the PON system from an optical line terminal (OLT) to one or more optical network terminals (ONT)/optical network units (ONU), but also may be used to carry data transmitted from the ONT/ONU to the OLT, and may be further used to carry data in another optical network system or optical transmission system; and the prevent invention is not limited thereto.

Figure 2:
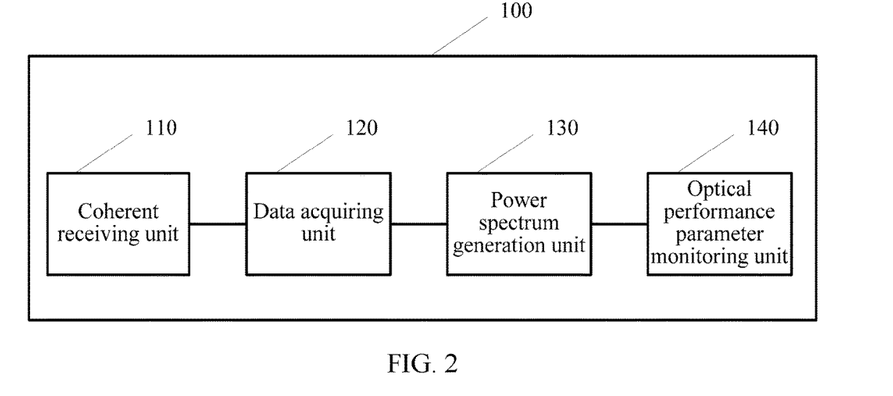
FIG. 2 is a schematic block diagram of an apparatus for monitoring an optical performance parameter according to an embodiment of the present invention.

FIG. 2 shows a schematic block diagram of an apparatus 100 for monitoring an optical performance parameter according to an embodiment of the present invention. As shown in FIG. 2, the apparatus 100 includes:

a coherent receiving unit 110, configured to perform coherent synthesis on a received to-be-detected optical signal and a multi-wavelength local oscillation laser beam, and convert a coherent receiving signal formed by means of the coherent synthesis into an analog electrical signal;

a data acquiring unit 120, configured to acquire the analog electrical signal output by the coherent receiving unit 110, and convert the analog electrical signal into a digital signal;

a power spectrum generation unit 130, configured to process the digital signal output by the data acquiring unit 120, to generate a continuous full power spectrum of the to-be-detected optical signal; and an optical performance parameter monitoring unit 140, configured to monitor, according to the continuous full power spectrum generated by the power spectrum generation unit 130, an optical performance parameter of a transmission link carrying the to-be-detected optical signal.

Specifically, as shown in FIG. 2, to monitor the optical performance parameter with high precision, the apparatus 100 for monitoring an optical performance parameter according to this embodiment of the present invention may include the coherent receiving unit 110, the data acquiring unit 120, the power spectrum generation unit 130, and the optical performance parameter monitoring unit 140. The coherent receiving unit 110 may perform coherent synthesis on a to-be-detected optical signal and a multi-wavelength local oscillation laser beam based on a coherent optical communication principle. Because a phase characteristic of an optical signal is further considered, coherent synthesis can significantly improve an anti-interference capability of the optical signal, so that the apparatus can improve precision of monitoring an optical performance parameter. The optical signal on which coherent synthesis is performed, for example, may be received by an optoelectronic detector, so as to convert the optical signal into an analog electrical signal. The analog electrical signal, for example, may be acquired by the data acquiring unit 120 including an analog to digital converter (ADC), and the analog electrical signal is converted into a digital signal. The power spectrum generation unit 130 may process the digital signal, to generate a continuous full power spectrum of the to-be-detected optical signal, so that the optical performance parameter monitoring unit 140 can monitor, according to the continuous full power spectrum, an optical performance parameter of a transmission link carrying the to-be-detected optical signal.

Specifically, in this embodiment of the present invention, on one hand, coherent synthesis is directly performed on a received to-be-detected optical signal and a multi-wavelength local oscillation laser beam, so as to monitor an optical signal, in the to-be-detected optical signal, whose wavelength is the same as a wavelength of the local oscillation laser beam, so that there is no need to use a filter to acquire a to-be-detected optical signal that has a particular wavelength and there is no need to monitor the to-be-detected optical signal, which can prevent damage to a signal caused when a filter is used, and improve precision of monitoring an optical performance parameter by the apparatus; on the other hand, in the present invention, an optical signal is processed by using a coherent synthesis technology, which can significantly improve an anti-interference capability of the optical signal, thereby further improving precision of monitoring an optical performance parameter by the apparatus.

Therefore, the apparatus for monitoring an optical performance parameter in this embodiment of the present invention performs coherent synthesis on a received to-be-detected optical signal and a multi-wavelength local oscillation laser beam, and performs corresponding signal processing to generate a continuous full power spectrum of the to-be-detected optical signal, so that an optical performance parameter of a transmission link carrying the to-be-detected optical signal can be monitored according to the continuous full power spectrum, which can prevent damage to a signal caused when a filter is used, thereby monitoring an optical performance parameter with high precision.

The following separately describes the coherent receiving unit 110, the data acquiring unit 120, the power spectrum generation unit 130, and the optical performance parameter monitoring unit 140 that are included in the apparatus 100 according to this embodiment of the present invention with reference to FIG. 3 to FIG. 6.

Figure 3:
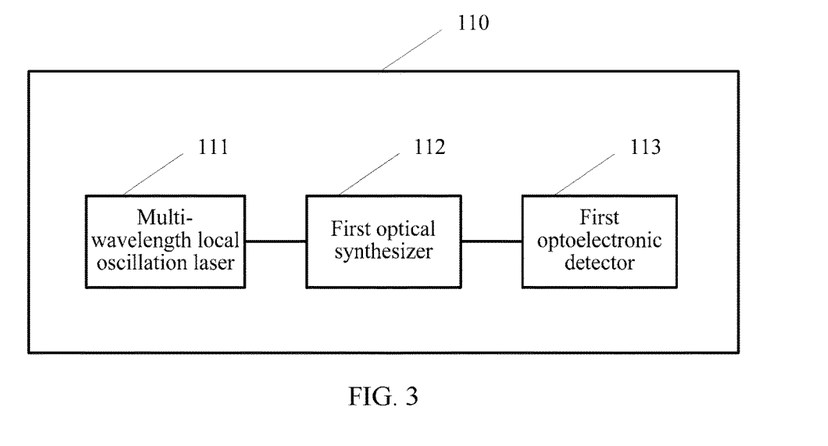
FIG. 3 is a schematic block diagram of a coherent receiving unit according to an embodiment of the present invention.

In this embodiment of the present invention, as shown in FIG. 3, the coherent receiving unit 110 includes:

a multi-wavelength local oscillation laser 111, configured to output the multi-wavelength local oscillation laser beam;

a first optical synthesizer 112, configured to perform coherent synthesis on a first to-be-detected optical signal that has a first polarization state and that is in the to-be-detected optical signal and a first local oscillation laser beam that has the first polarization state and that is in the multi-wavelength local oscillation laser beam; and a first optoelectronic detector 113, configured to receive the coherent receiving signal generated after the first optical synthesizer 112 performs the coherent synthesis, and convert the coherent receiving signal into the analog electrical signal.

In this embodiment of the present invention, the multi-wavelength local oscillation laser 111 may output the multi-wavelength local oscillation laser beam, where a frequency band that the multi-wavelength local oscillation laser beam has includes frequencies that a part or all of an optical signal in the to-be-detected optical signal has, or a wavelength of the multi-wavelength local oscillation laser beam includes wavelengths of a part or all of an optical signal in the to-be-detected optical signal, so that coherent synthesis can be performed on the multi-wavelength local oscillation laser beam and the part or all of the optical signal. Therefore, continuous power spectra, in multiple different frequency bands corresponding to the multi-wavelength local oscillation laser beam, of the to-be-detected optical signal can be obtained, so as to further obtain a continuous full power spectrum of the to-be-detected optical signal.

A wavelength range of the to-be-detected optical signal may be a wavelength range in a DWDM system, for example, the wavelength range may be from 1528.77 nm to 1560.61 nm. However, it should be understood that, in this embodiment of the present invention, the example is merely used for description, but the present invention is not limited thereto, for example, the wavelength range of the to-be-detected optical signal may also be another value.

In this embodiment of the present invention, optionally, the multi-wavelength local oscillation laser 111 is a tunable laser, and a wavelength of a laser beam that is output by the tunable laser includes a wavelength of the to-be-detected optical signal. That is, a frequency band of a laser beam that can be output by the tunable laser may include a frequency that the to-be-detected optical signal has.

For example, a frequency tunable range of the tunable laser may include an entire communication band, that is, includes a C band and an L band. Therefore, a particular wavelength in the to-be-detected optical signal can be selectively monitored by changing a wavelength of a laser beam that is output by the tunable laser, so that there is no need to use a filter to acquire a to-be-detected optical signal that has a particular wavelength and there is no need to monitor the to-be-detected optical signal, which can prevent damage to a signal caused when a filter is used, thereby improving precision of monitoring an optical performance parameter by the apparatus.

In addition, when the frequency tunable range of the tunable laser is determined, a frequency band interval between the multiple different frequency bands corresponding to the multi-wavelength local oscillation laser beam may be adjusted by determining a frequency tuning step length of the tunable laser, so that precision, accuracy, and a monitoring time of a finally acquired continuous full power spectrum of the to-be-detected optical signal can be changed.

Therefore, according to the apparatus for monitoring an optical performance parameter in this embodiment of the present invention, when the multi-wavelength local oscillation laser beam is output by using the tunable laser, not only damage to a signal caused when a filter is used can be prevented, but also frequency tuning precision of the tunable laser can be changed as required, so that precision, accuracy, and a monitoring time of a finally acquired continuous full power spectrum of the to-be-detected optical signal can be changed. Therefore, performance of monitoring an optical performance parameter by the apparatus according to this embodiment of the present invention is controllable.

It should be understood that, in this embodiment of the present invention, to reduce costs of the apparatus and reduce a time that the tunable laser spends in tuning a frequency each time, the frequency tuning step length of the tunable laser may be increased, but an increase in the frequency tuning step length causes a restored power spectrum to be indistinct and rough. Therefore, an optimization algorithm needs to be used to perform optimization. The optimization algorithm is, for example, the Wiener deconvolution algorithm. In this algorithm, optical devices need to be considered as a whole, to estimate a response curve of the apparatus, thereby obtaining an entire response curve of the optical devices, so as to perform optimization. After optimization processing is performed by using the Wiener deconvolution algorithm, a high-precision and high-accuracy continuous full power spectrum can be obtained, so that an optical performance parameter can be monitored with high precision, a monitoring time can be shortened, and costs of the apparatus are reduced.

In this embodiment of the present invention, optionally, the multi-wavelength local oscillation laser 111 is an optical frequency comb; and the coherent receiving unit 110 further includes: a band-pass filter BPF, configured to perform filtering on the multi-wavelength local oscillation laser beam that is output by the optical frequency comb, where a frequency of the to-be-detected optical signal is within a range of cut-off frequencies of the band-pass filter.

That is, the band-pass filter may be configured to select a multi-wavelength local oscillation laser beam that is output by the optical frequency comb, so that a multi-wavelength local oscillation laser beam within a range including a to-be-detected frequency band can be output, where the to-be-detected frequency band includes a frequency of the to-be-detected optical signal, so that coherent synthesis can be performed on the multi-wavelength local oscillation laser beam and the to-be-detected optical signal, where the cut-off frequencies of the band-pass filter may be set according to a frequency band of the to-be-detected optical signal.

In this embodiment of the present invention, the optical frequency comb is used as the multi-wavelength local oscillation laser, and by using a characteristic that an optical frequency comb device can simultaneously generate multiple optical sources, coherent synthesis on signals of multiple frequencies can be implemented simultaneously, which can increase a degree of parallelism of the coherent synthesis, and can shorten a time for monitoring an optical performance parameter. In addition, the multi-wavelength local oscillation laser beam that is output by the optical frequency comb has stable performance, which can further improve precision and accuracy of monitoring an optical performance parameter.

It should be understood that, when the optical frequency comb is used as the multi-wavelength local oscillation laser, multiple optoelectronic detectors may be used to receive the optical signal on which coherent synthesis is performed, multiple data acquiring units may be used, and the like, so as to rapidly generate the continuous full power spectrum of the to-be-detected optical signal, so that a time for monitoring an optical performance parameter can be shortened.

It should be understood that, in this embodiment of the present invention, the multi-wavelength local oscillation laser may not only include a laser that simultaneously outputs a laser beam having multiple center wavelengths, for example, an optical frequency comb. The multi-wavelength local oscillation laser may also include a laser that outputs a laser beam having multiple center wavelengths in a time division manner, for example, a tunable laser. In this embodiment of the present invention, the optical frequency comb and the tunable laser are merely used as an example for description, but the present invention is not limited thereto.

It should be further understood that, in this embodiment of the present invention, the multi-wavelength local oscillation laser beam may indicate a laser beam that is output simultaneously or in a time division manner and that has multiple different center wavelengths, where each center wavelength may correspond to one frequency band, that is, the multi-wavelength local oscillation laser beam may correspond to multiple different frequency bands.

It should be further understood that, in this embodiment of the present invention, the performing coherent synthesis on a to-be-detected optical signal and a multi-wavelength local oscillation laser beam may not only include simultaneously performing coherent synthesis on the to-be-detected optical signal and a laser beam having multiple different center wavelengths, but also may include performing, in a time division manner, coherent synthesis on the to-be-detected optical signal and a laser beam having multiple different center wavelengths. Therefore, the continuous power spectra, in the multiple different frequency bands corresponding to the multi-wavelength local oscillation laser beam, of the to-be-detected optical signal can be obtained. In this embodiment of the present invention, this example is merely used for description, but the present invention is not limited thereto.

In this embodiment of the present invention, optionally, the first optical synthesizer 112 is an optical coupler or an optical hybrid. Preferably, when the first optical synthesizer 112 is an optical hybrid, a bandwidth of the first optoelectronic detector 113 is within a range of 500 MHz to 2 GHz.

Specifically, the optical hybrid is, for example, a 90° optical hybrid, and the optical coupler is, for example, a 180° optical coupler. In addition, compared with the optical hybrid (Hybrid), the optical coupler is lower in costs, and moreover, replacing the optical hybrid with the optical coupler can not only ensure that an optical performance parameter is monitored with high precision, but also can reduce a quantity of optoelectronic detectors on an output end, thereby further reducing costs of the apparatus for monitoring an optical performance parameter.

In this embodiment of the present invention, when the multi-wavelength local oscillation laser beam that is output by the multi-wavelength local oscillation laser 111 or the received to-be-detected optical signal is a non-single polarization laser beam, a polarization state of the optical signal may be adjusted by using a polarization controller, and single-polarization light may be divided in space by using a polarization beam splitter.

Figure 4:
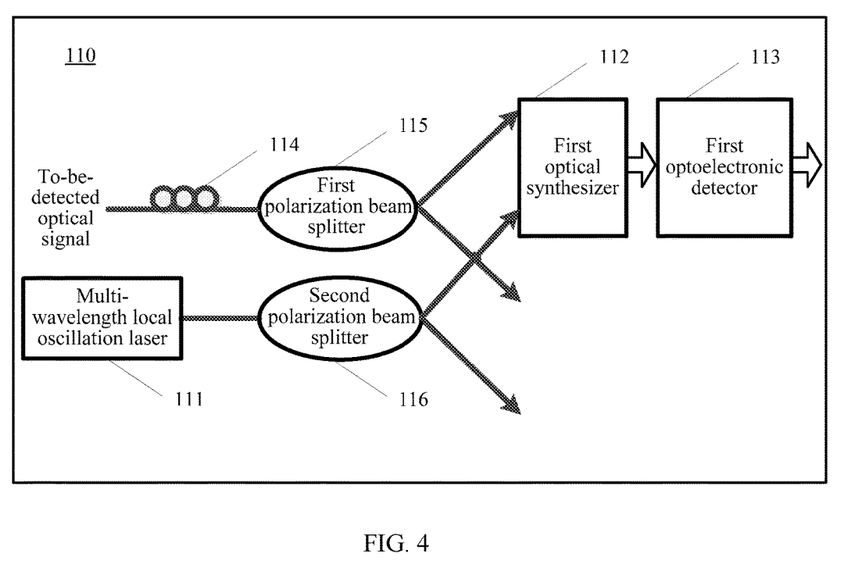
FIG. 4 is another schematic block diagram of a coherent receiving unit according to an embodiment of the present invention.

Specifically, in this embodiment of the present invention, optionally, as shown in FIG. 4, the coherent receiving unit 110 further includes:

a polarization controller 114, configured to adjust a polarization state of the received to-be-detected optical signal;

a first polarization beam splitter 115, configured to divide, into the first to-be-detected optical signal and a second to-be-detected optical signal whose polarization states are perpendicular to each other, the to-be-detected optical signal output by the polarization controller 114, where the first to-be-detected optical signal is input to the first optical synthesizer 112; and a second polarization beam splitter 116, configured to divide, into the first local oscillation laser beam and a second local oscillation laser beam whose polarization states are perpendicular to each other, the multi-wavelength local oscillation laser beam that is output by the multi-wavelength local oscillation laser 111, where the first local oscillation laser beam is input to the first optical synthesizer 112.

It should be understood that, in this embodiment of the present invention, the coherent receiving unit 110 may perform coherent synthesis only on a to-be-detected optical signal and a local oscillation laser beam that have a second polarization state perpendicular to the first polarization state, and convert the optical signal on which coherent synthesis is performed into an analog electrical signal, so that an optical performance parameter can be monitored precisely, and the apparatus is simple in structure and low in costs.

It should be further understood that, in this embodiment of the present invention, to further improve precision of monitoring an optical performance parameter, the coherent receiving unit 110 may not only perform coherent synthesis on the to-be-detected optical signal and the local oscillation laser beam that have the first polarization state, but also may perform coherent synthesis on the to-be-detected optical signal and the local oscillation laser beam that has the second polarization state perpendicular to the first polarization state.

Figure 5:
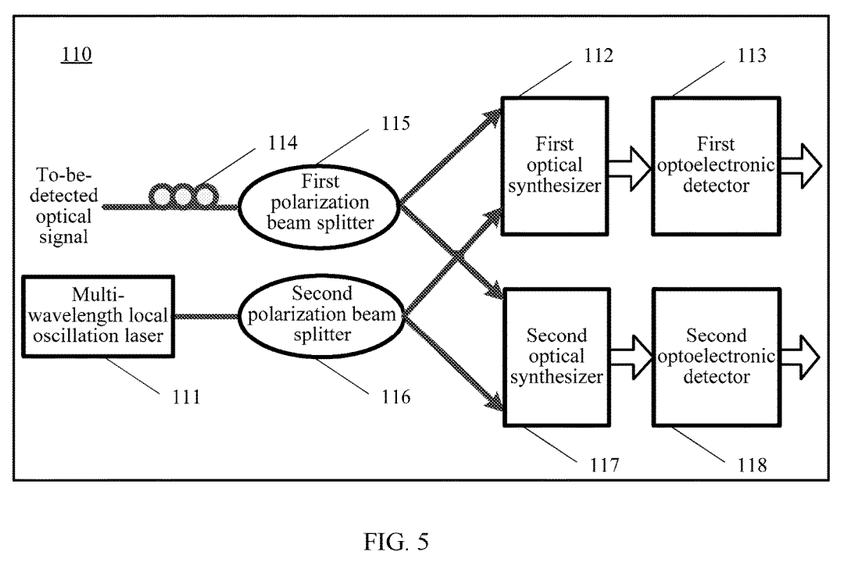
FIG. 5 is still another schematic block diagram of a coherent receiving unit according to an embodiment of the present invention.

Specifically, in this embodiment of the present invention, as shown in FIG. 5, optionally, the coherent receiving unit 110 further includes:

a second optical synthesizer 117, configured to receive the second to-be-detected optical signal that has a second polarization state and the second local oscillation laser beam that has the second polarization state, and perform coherent synthesis on the second to-be-detected optical signal and the second local oscillation laser beam, where the second polarization state is perpendicular to the first polarization state; and a second optoelectronic detector 118, configured to receive the coherent receiving signal generated after the second optical synthesizer 117 performs the coherent synthesis, and convert the coherent receiving signal into the analog electrical signal.

Specifically, after the polarization state of the received to-be-detected optical signal is adjusted by the polarization controller 114, the to-be-detected optical signal is input to the first polarization beam splitter 115. The first polarization beam splitter 115 divides the to-be-detected optical signal into the first to-be-detected optical signal and the second to-be-detected optical signal whose polarization states are perpendicular to each other. The first to-be-detected optical signal has the first polarization state and is input to the first optical synthesizer 112, and the second to-be-detected optical signal has the second polarization state and is input to the second optical synthesizer 117. The multi-wavelength local oscillation laser beam that is output by the multi-wavelength local oscillation laser 111 is divided by the second polarization beam splitter 116 into the first local oscillation laser beam and the second local oscillation laser beam whose polarization states are perpendicular to each other. The first local oscillation laser beam has the first polarization state and is input to the first optical synthesizer 112, and the second local oscillation laser beam has the second polarization state and is input to the second optical synthesizer 117.

The first optical synthesizer 112 performs coherent synthesis on the first to-be-detected optical signal and the first local oscillation laser beam that have the first polarization state, and inputs a coherent receiving signal obtained after the coherent synthesis to the first optoelectronic detector 113. The second optical synthesizer 117 performs coherent synthesis on the second to-be-detected optical signal and the second local oscillation laser beam that have the second polarization state, and inputs a coherent receiving signal obtained after the coherent synthesis to the second optoelectronic detector 118. The first optoelectronic detector 113 and the second optoelectronic detector 118 respectively convert the coherent receiving signals into analog electrical signals.

In this embodiment of the present invention, optionally, the second optical synthesizer 117 is an optical hybrid or an optical coupler. Preferably, when the second optical synthesizer 117 is an optical hybrid, a bandwidth of the second optoelectronic detector 118 is within a range of 500 MHz to 2 GHz.

Optionally, a bandwidth of the first optoelectronic detector 113 or the second optoelectronic detector 118 is within a range of 500 MHz to 1 GHz or a range of 1 GHz to 2 GHz. For example, the bandwidth of the first optoelectronic detector 113 or the second optoelectronic detector 118 is 500 MHz, 800 MHz, or 1 GHz, so as to reduce a bandwidth requirement of the first optoelectronic detector 113 or the second optoelectronic detector 118, thereby significantly reducing costs of the apparatus.

It should be understood that, in this embodiment of the present invention, the first optoelectronic detector or the second optoelectronic detector may be a device that converts the received optical signal into an electrical signal, for example, the first optoelectronic detector or the second optoelectronic detector may be a photodiode, a PIN photodiode, or an avalanche photodiode, but this embodiment of the present invention is not limited thereto.

In this embodiment of the present invention, the data acquiring unit 120 includes, for example, an analog to digital converter ADC, so as to convert the acquired analog electrical signal into a digital signal, where a bandwidth of the ADC may be within a range of 500 MHz to 2 GHz.

For example, in this embodiment of the present invention, the tunable laser is configured to output the multi-wavelength local oscillation laser beam. A tuning step length of the tunable laser is, for example, 1 GHz; in this case, the bandwidth of the first optoelectronic detector or the second optoelectronic detector may be 500 MHz, and the bandwidth of the ADC included in the data acquiring unit 120 may also be 500 MHz. For another example, a tuning step length of the tunable laser is 5 GHz; in this case, the bandwidth of the first optoelectronic detector or the second optoelectronic detector may be 1 GHz, and the bandwidth of the ADC included in the data acquiring unit 120 may also be 1 GHz. However, it should be understood that, in this embodiment of the present invention, these examples are merely used for description, but the present invention is not limited thereto.

Figure 6:
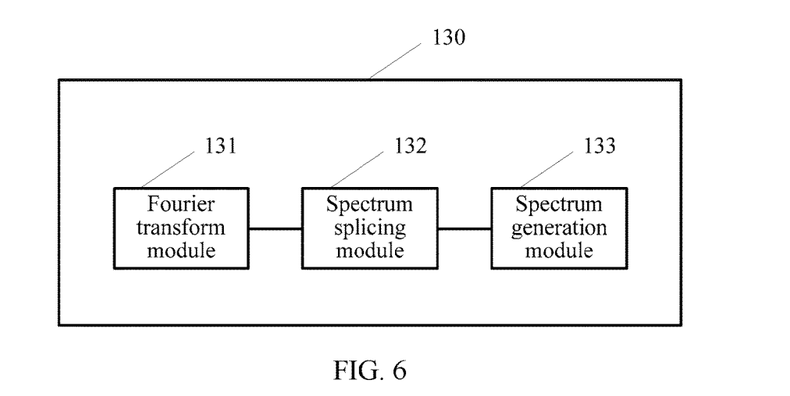
FIG. 6 is a schematic block diagram of a power spectrum generation unit according to an embodiment of the present invention.

FIG. 6 further shows a schematic block diagram of a power spectrum generation unit 130 according to an embodiment of the present invention. As shown in FIG. 6, the power spectrum generation unit 130 includes:

a Fourier transform module 131, configured to perform Fourier transformation on the digital signal output by the data acquiring unit, to generate continuous power spectra, in multiple different frequency bands corresponding to the multi-wavelength local oscillation laser beam, of the to-be-detected optical signal;

a spectrum splicing module 132, configured to generate a discrete full power spectrum of the to-be-detected optical signal according to the continuous power spectra in the multiple different frequency bands; and a spectrum generation module 133, configured to generate a continuous power spectrum of the to-be-detected optical signal according to the discrete full power spectrum of the to-be-detected optical signal by using an interpolation algorithm.

Specifically, the coherent receiving unit 110 may perform coherent synthesis on a local oscillation laser beam that is in one or more particular frequency bands and the to-be-detected optical signal each time, and the Fourier transform module 131 performs Fourier transformation to generate continuous power spectra, in the one or more particular frequency bands, of the to-be-detected optical signal. For example, continuous power spectra, in multiple different frequency bands, of the to-be-detected optical signal may be obtained by continuously changing output frequency bands of the multi-wavelength local oscillation laser. Therefore, the spectrum splicing module 132 may generate the discrete full power spectrum of the to-be-detected optical signal according to the continuous power spectra in the multiple different frequency bands, so that the spectrum generation module 133 may generate the continuous power spectrum of the to-be-detected optical signal according to the discrete full power spectrum of the to-be-detected optical signal by using the interpolation algorithm.

In this embodiment of the present invention, when a channel environment is relatively bad, to estimate a continuous power spectrum of a to-be-detected optical signal more accurately, averaging processing may be performed on multiple coherent receiving signals in a same frequency band, so as to improve precision of determining a continuous power spectrum, in the same frequency band corresponding to the multi-wavelength local oscillation laser beam, of the to-be-detected optical signal, thereby further improving precision of monitoring an optical performance parameter by the apparatus.

Specifically, in this embodiment of the present invention, optionally, the Fourier transform module 131 is specifically configured to:

perform averaging processing on multiple digital signals that are output by the data acquiring unit and that are in a same frequency band; and perform Fourier transformation on the digital signals on which the averaging processing has been performed, to generate a continuous power spectrum, in the same frequency band corresponding to the multi-wavelength local oscillation laser beam, of the to-be-detected optical signal.

It should be understood that, in this embodiment of the present invention, the term "full power spectrum" indicates a power spectrum of the to-be-detected optical signal in an entire to-be-detected frequency band. The to-be-detected frequency band indicates a frequency band corresponding to the to-be-detected optical signal. For example, the "discrete full power spectrum" indicates a discrete power spectrum of the to-be-detected optical signal in the entire to-be-detected frequency band, and the "continuous full power spectrum" indicates a continuous power spectrum of the to-be-detected optical signal in the entire to-be-detected frequency band. It should be further understood that, in this embodiment of the present invention, the term "discrete" is relative to "continuous", for example, the "discrete full power spectrum" indicates a power spectrum in a part of a frequency band in the entire to-be-detected frequency band, and is discontinuous in the entire to-be-detected frequency band, that is, power spectra in some particular frequency bands in the to-be-detected frequency band are missing.

In this embodiment of the present invention, the optical performance parameter monitoring unit 140 is configured to monitor, according to the continuous full power spectrum generated by the power spectrum generation unit, an optical performance parameter of a transmission link carrying the to-be-detected optical signal. Specifically, the optical performance parameter monitored by the optical performance parameter monitoring unit 140 may include at least one parameter of the following parameters: an optical signal-to-noise ratio OSNR, optical power, a modulation format, a channel wavelength shift, amplified spontaneous emission ASE (ASE) noise, an amplifier gain, and a gain tilt.

It should be understood that, in this embodiment of the present invention, because a detected coherent receiving signal includes a power part of a local oscillation laser beam and a loss caused when an optical signal passes through the foregoing optical devices, for example, after fast Fourier transform (FFT) is performed on a digital signal output by the data acquiring unit, a relatively rough spectrum in a particular frequency band is obtained. To obtain a high-precision continuous full power spectrum of the to-be-detected optical signal, optimization processing, such as spectrum splicing, power correction, and coefficient compensation, may be further performed on the rough spectrum, so as to obtain a high-precision and high-accuracy continuous full power spectrum, thereby further improving precision of monitoring an optical performance parameter.

It should be further understood that, in this embodiment of the present invention, to facilitate better monitoring an optical performance parameter, before entering an optoelectronic detector, each optical signal may further enter another optical device, for example, may be split by an optical splitter, or may be condensed by a focusing lens, which is not limited in this embodiment of the present invention. In addition, in this embodiment of the present invention, it may be further understood that, units may be separately and independently disposed, or may be integrally disposed as an optical performance monitoring OPM module, but this embodiment of the present invention is not limited thereto.

Therefore, the apparatus for monitoring an optical performance parameter in this embodiment of the present invention performs coherent synthesis on a received to-be-detected optical signal and a multi-wavelength local oscillation laser beam, and performs corresponding signal processing to generate a continuous full power spectrum of the to-be-detected optical signal, so that an optical performance parameter of a transmission link carrying the to-be-detected optical signal can be monitored according to the continuous full power spectrum, which can prevent damage to a signal caused when a filter is used, thereby monitoring an optical performance parameter with high precision.

In addition, the apparatus for monitoring an optical performance parameter in this embodiment of the present invention can perform high-precision, real-time, and online multi-parameter monitoring for different transmission channels, can monitor multiple parameters in an entire band of optical communication, can also perform multi-parameter monitoring mainly for a transmission link, and can reflect a parameter of network performance by means of online monitoring, so as to facilitate monitoring and management of an optical network. In addition, the apparatus according to this embodiment of the present invention further has advantages such as low, controllable performance of monitoring an optical performance parameter, and short time for monitoring an optical performance parameter.

The units for monitoring an optical performance parameter according to this embodiment of the present invention are described in detail above with reference to FIG. 1 to FIG. 6. A method for monitoring an optical performance parameter, and an optical transmission system according to embodiments of the present invention are described in detail below with reference to FIG. 7 to FIG. 10.

Figure 7:
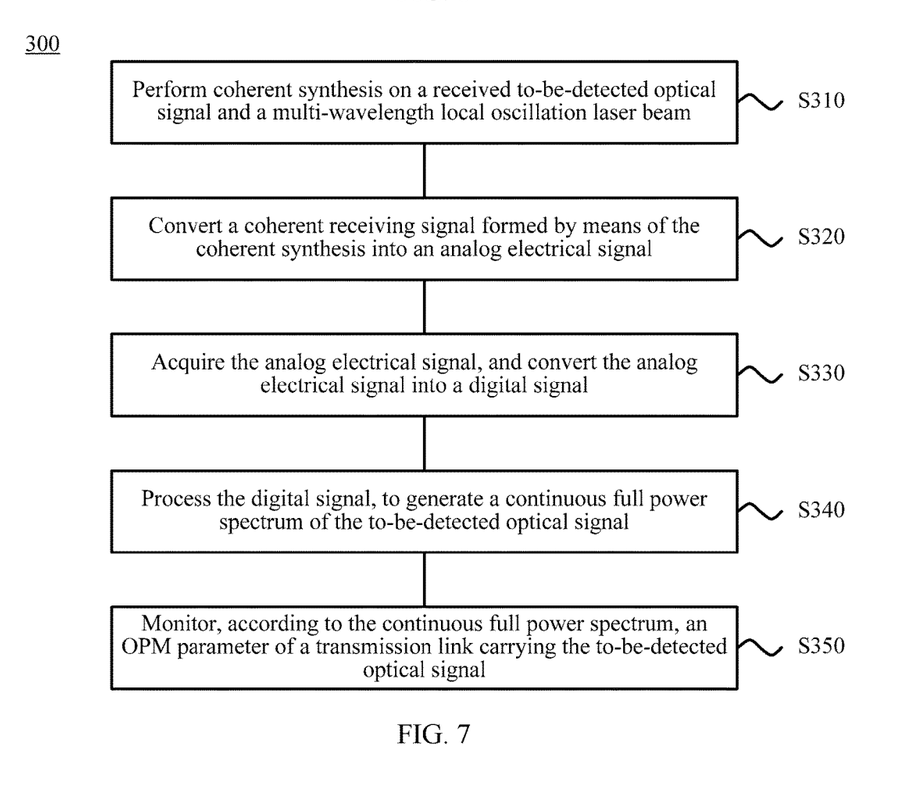
FIG. 7 is a schematic flowchart of a method for monitoring an optical performance parameter according to an embodiment of the present invention.

FIG. 7 shows a schematic flowchart of a method 300 for monitoring an optical performance parameter according to an embodiment of the present invention. The method 300 may be performed by the apparatus 100 for monitoring an optical performance parameter according to the embodiments of the present invention, for example, the method 300 may be performed by an OPM module. As shown in FIG. 7, the method 300 includes:

S310: Perform coherent synthesis on a received to-be-detected optical signal and a multi-wavelength local oscillation laser beam.

S320: Convert a coherent receiving signal formed by means of the coherent synthesis into an analog electrical signal.

S330: Acquire the analog electrical signal, and convert the analog electrical signal into a digital signal.

S340: Process the digital signal, to generate a continuous full power spectrum of the to-be-detected optical signal.

S350: Monitor, according to the continuous full power spectrum, an optical performance parameter of a transmission link carrying the to-be-detected optical signal.

Therefore, according to the method for monitoring an optical performance parameter in this embodiment of the present invention, coherent synthesis is performed on a received to-be-detected optical signal and a multi-wavelength local oscillation laser beam, and corresponding signal processing is performed to generate a continuous full power spectrum of the to-be-detected optical signal, so that an optical performance parameter of a transmission link carrying the to-be-detected optical signal can be monitored according to the continuous full power spectrum, which can prevent damage to a signal caused when a filter is used, thereby monitoring an optical performance parameter with high precision.

In this embodiment of the present invention, optionally, the performing coherent synthesis on a received to-be-detected optical signal and a multi-wavelength local oscillation laser beam includes:

performing coherent synthesis on a first to-be-detected optical signal that has a first polarization state and that is in the to-be-detected optical signal and a first local oscillation laser beam that has the first polarization state and that is in the multi-wavelength local oscillation laser beam.

Figure 8:
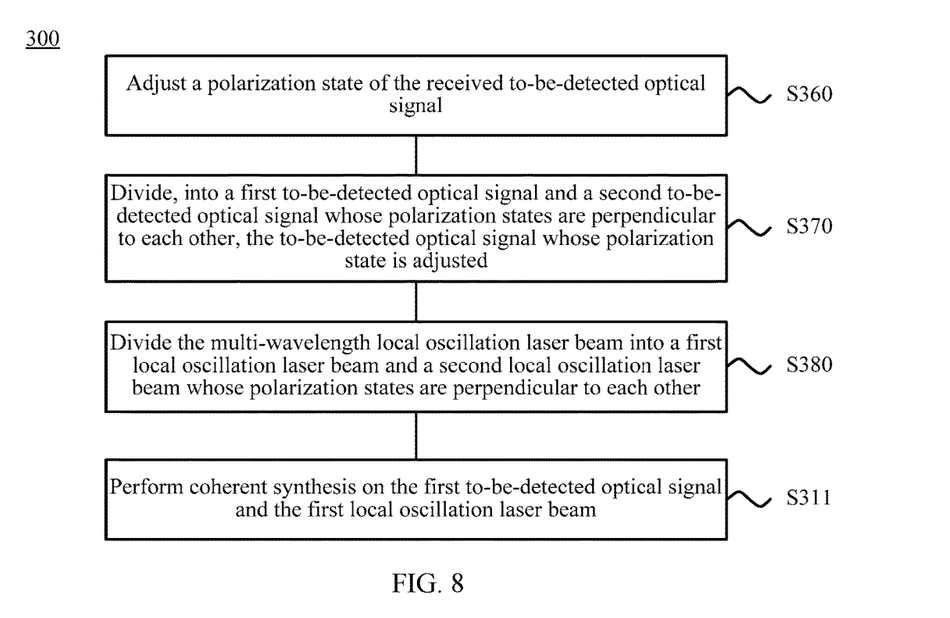
FIG. 8 is another schematic flowchart of a method for monitoring an optical performance parameter according to an embodiment of the present invention.

In this embodiment of the present invention, optionally, as shown in FIG. 8, before the performing coherent synthesis on a received to-be-detected optical signal and a multi-wavelength local oscillation laser beam, the method 300 further includes:

S360: Adjust a polarization state of the received to-be-detected optical signal.

S370: Divide, into the first to-be-detected optical signal and a second to-be-detected optical signal whose polarization states are perpendicular to each other, the to-be-detected optical signal whose polarization state is adjusted.

S380: Divide the multi-wavelength local oscillation laser beam into the first local oscillation laser beam and a second local oscillation laser beam whose polarization states are perpendicular to each other.

The performing coherent synthesis on a received to-be-detected optical signal and a multi-wavelength local oscillation laser beam includes:

S311: Perform coherent synthesis on the first to-be-detected optical signal and the first local oscillation laser beam.

In this embodiment of the present invention, optionally, the performing coherent synthesis on a received to-be-detected optical signal and a multi-wavelength local oscillation laser beam includes:

performing coherent synthesis on the first to-be-detected optical signal and the first local oscillation laser beam; and performing coherent synthesis on the second to-be-detected optical signal that has a second polarization state and the second local oscillation laser beam that has the second polarization state, where the second polarization state is perpendicular to the first polarization state.

Figure 9:
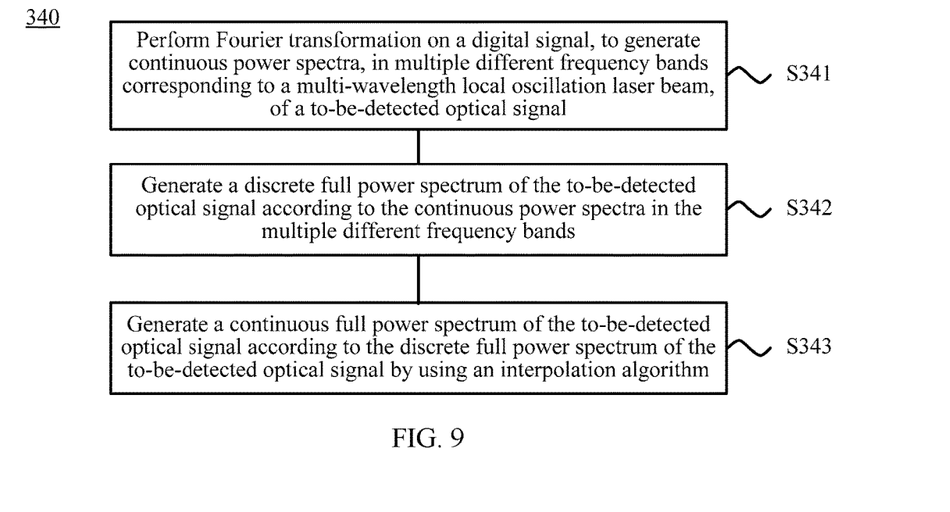
FIG. 9 is still another schematic flowchart of a method for monitoring an optical performance parameter according to an embodiment of the present invention.

In this embodiment of the present invention, optionally, as shown in FIG. 9, the processing the digital signal, to generate a continuous full power spectrum of the to-be-detected optical signal includes:

S341: Perform Fourier transformation on the digital signal, to generate continuous power spectra, in multiple different frequency bands corresponding to the multi-wavelength local oscillation laser beam, of the to-be-detected optical signal.

S342: Generate a discrete full power spectrum of the to-be-detected optical signal according to the continuous power spectra in the multiple different frequency bands.

S343: Generate the continuous full power spectrum of the to-be-detected optical signal according to the discrete full power spectrum of the to-be-detected optical signal by using an interpolation algorithm.

It should be understood that, in the embodiments of the present invention, sequence numbers of the foregoing processes do not mean execution sequences, and should not be construed as any limitation to the implementation processes of the embodiments of the present invention. The execution sequences of the processes should be determined according to functions and internal logic of the processes.

It should be understood that, in this embodiment of the present invention, the multi-wavelength local oscillation laser that outputs the multi-wavelength local oscillation laser beam is a tunable laser, and a wavelength of a laser beam that is output by the tunable laser includes a wavelength of the to-be-detected optical signal.

Optionally, in this embodiment of the present invention, the multi-wavelength local oscillation laser that outputs the multi-wavelength local oscillation laser beam is an optical frequency comb, where the multi-wavelength local oscillation laser beam that is output by the optical frequency comb may be filtered by a band-pass filter BPF, where a frequency of the to-be-detected optical signal is within a range of cut-off frequencies of the band-pass filter.

Optionally, in this embodiment of the present invention, a first optical synthesizer or a second optical synthesizer configured to perform coherent synthesis on the received to-be-detected optical signal and the multi-wavelength local oscillation laser beam is an optical hybrid, and a bandwidth of a first optoelectronic detector or a second optoelectronic detector configured to convert the coherent receiving signal formed by means of the coherent synthesis into the analog electrical signal is within a range of 500 MHz to 2 GHz.

Optionally, in this embodiment of the present invention, the first optical synthesizer or the second optical synthesizer is an optical coupler.

Optionally, in this embodiment of the present invention, the monitored optical performance parameter includes at least one parameter of the following parameters: an optical signal-to-noise ratio OSNR, optical power, a modulation format, a channel wavelength shift, amplified spontaneous emission ASE noise, an amplifier gain, and a gain tilt.

Therefore, according to the method for monitoring an optical performance parameter in this embodiment of the present invention, coherent synthesis is performed on a received to-be-detected optical signal and a multi-wavelength local oscillation laser beam, and corresponding signal processing is performed to generate a continuous full power spectrum of the to-be-detected optical signal, so that an optical performance parameter of a transmission link carrying the to-be-detected optical signal can be monitored according to the continuous full power spectrum, which can prevent damage to a signal caused when a filter is used, thereby monitoring an optical performance parameter with high precision.

Figure 10:
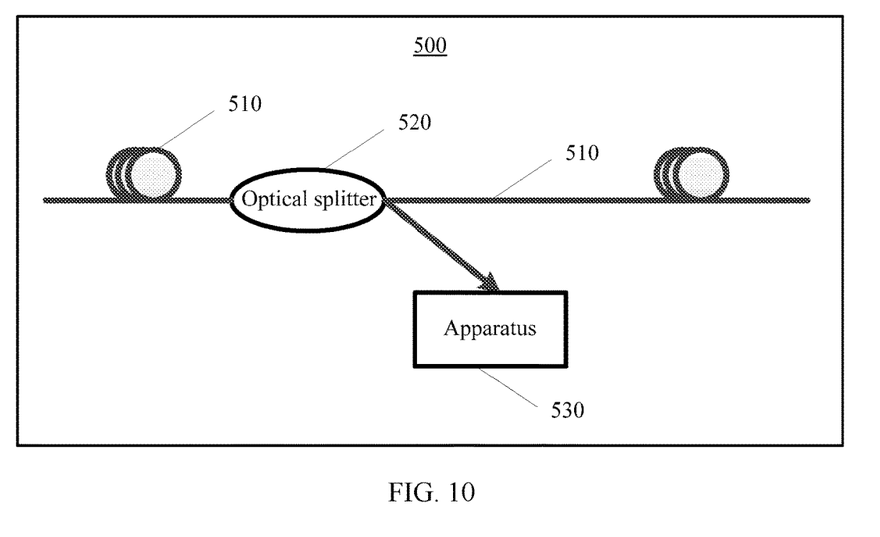
FIG. 10 is a schematic block diagram of an optical transmission system according to an embodiment of the present invention.

As shown in FIG. 10, an embodiment of the present invention further provides an optical transmission system 500. The optical transmission system 500 includes:

a fiber link 510, configured to transmit an optical signal;

an optical splitter 520, disposed in the fiber link 510, and configured to divide the optical signal into a first optical signal and a second optical signal, where a strength of the first optical signal is greater than a strength of the second optical signal; and an apparatus 530 for monitoring an optical performance parameter according to an embodiment of the present invention, configured to receive the second optical signal output by the optical splitter 520, and perform monitoring on an optical performance parameter of the second optical signal, where the apparatus includes: a coherent receiving unit, configured to perform coherent synthesis on a received to-be-detected optical signal and a multi-wavelength local oscillation laser beam, and convert a coherent receiving signal formed by means of the coherent synthesis into an analog electrical signal; a data acquiring unit, configured to acquire the analog electrical signal output by the coherent receiving unit, and convert the analog electrical signal into a digital signal; a power spectrum generation unit, configured to process the digital signal output by the data acquiring unit, to generate a continuous full power spectrum of the to-be-detected optical signal; and an optical performance parameter monitoring unit, configured to monitor, according to the continuous full power spectrum generated by the power spectrum generation unit, an optical performance parameter of a transmission link carrying the to-be-detected optical signal.

Therefore, the optical transmission system in this embodiment of the present invention performs coherent synthesis on a received to-be-detected optical signal and a multi-wavelength local oscillation laser beam, and performs corresponding signal processing to generate a continuous full power spectrum of the to-be-detected optical signal, so that an optical performance parameter of a transmission link carrying the to-be-detected optical signal can be monitored according to the continuous full power spectrum, which can prevent damage to a signal caused when a filter is used, thereby monitoring an optical performance parameter with high precision.

In this embodiment of the present invention, the optical splitter 520 has a split ratio of, for example, 90:10 or 80:20, so that most of the optical signal is still transmitted in the fiber link, that is, the first optical signal according to this embodiment of the present invention is still transmitted in the fiber link 510.

In this embodiment of the present invention, optionally, the coherent receiving unit includes: a multi-wavelength local oscillation laser, configured to output the multi-wavelength local oscillation laser beam; a first optical synthesizer, configured to perform coherent synthesis on a first to-be-detected optical signal that has a first polarization state and that is in the to-be-detected optical signal and a first local oscillation laser beam that has the first polarization state and that is in the multi-wavelength local oscillation laser beam; and a first optoelectronic detector, configured to receive the coherent receiving signal generated after the first optical synthesizer performs the coherent synthesis, and convert the coherent receiving signal into the analog electrical signal.

In this embodiment of the present invention, optionally, the coherent receiving unit further includes: a polarization controller, configured to adjust a polarization state of the received to-be-detected optical signal; a first polarization beam splitter, configured to divide, into the first to-be-detected optical signal and a second to-be-detected optical signal whose polarization states are perpendicular to each other, the to-be-detected optical signal output by the polarization controller, where the first to-be-detected optical signal is input to the first optical synthesizer; and a second polarization beam splitter, configured to divide, into the first local oscillation laser beam and a second local oscillation laser beam whose polarization states are perpendicular to each other, the multi-wavelength local oscillation laser beam that is output by the multi-wavelength local oscillation laser, where the first local oscillation laser beam is input to the first optical synthesizer.

In this embodiment of the present invention, optionally, the coherent receiving unit further includes: a second optical synthesizer, configured to receive the second to-be-detected optical signal that has a second polarization state and the second local oscillation laser beam that has the second polarization state, and perform coherent synthesis on the second to-be-detected optical signal and the second local oscillation laser beam, where the second polarization state is perpendicular to the first polarization state; and a second optoelectronic detector, configured to receive the coherent receiving signal generated after the second optical synthesizer performs the coherent synthesis, and convert the coherent receiving signal into the analog electrical signal.

In this embodiment of the present invention, optionally, the power spectrum generation unit includes: a Fourier transform module, configured to perform Fourier transformation on the digital signal output by the data acquiring unit, to generate continuous power spectra, in multiple different frequency bands corresponding to the multi-wavelength local oscillation laser beam, of the to-be-detected optical signal; a spectrum splicing module, configured to generate a discrete full power spectrum of the to-be-detected optical signal according to the continuous power spectra in the multiple different frequency bands; and a spectrum generation module, configured to generate a continuous power spectrum of the to-be-detected optical signal according to the discrete full power spectrum of the to-be-detected optical signal by using an interpolation algorithm.

In this embodiment of the present invention, optionally, the Fourier transform module is specifically configured to: perform averaging processing on multiple digital signals that are output by the data acquiring unit and that are in a same frequency band; and perform Fourier transformation on the digital signals on which the averaging processing has been performed, to generate a continuous power spectrum, in the same frequency band corresponding to the multi-wavelength local oscillation laser beam, of the to-be-detected optical signal.

In this embodiment of the present invention, optionally, the multi-wavelength local oscillation laser is a tunable laser, and a wavelength of a laser beam that is output by the tunable laser includes a wavelength of the to-be-detected optical signal.

In this embodiment of the present invention, optionally, the multi-wavelength local oscillation laser is an optical frequency comb; and the coherent receiving unit further includes: a band-pass filter BPF, configured to perform filtering on the multi-wavelength local oscillation laser beam that is output by the optical frequency comb, where a frequency of the to-be-detected optical signal is within a range of cut-off frequencies of the band-pass filter.

In this embodiment of the present invention, optionally, the first optical synthesizer or the second optical synthesizer is an optical hybrid, and a bandwidth of the first optoelectronic detector or the second optoelectronic detector is within a range of 500 MHz to 2 GHz.

In this embodiment of the present invention, optionally, the first optical synthesizer or the second optical synthesizer is an optical coupler.

In this embodiment of the present invention, optionally, the optical performance parameter monitored by the optical performance parameter monitoring unit includes at least one parameter of the following parameters: an optical signal-to-noise ratio OSNR, optical power, a modulation format, a channel wavelength shift, amplified spontaneous emission ASE noise, an amplifier gain, and a gain tilt.

It should be understood that, the apparatus 530 for monitoring an optical performance parameter that is included in the optical transmission system 500 according to this embodiment of the present invention may correspond to an execution body of the method for monitoring an optical performance parameter according to the embodiments of the present invention, and may correspond to the apparatus 300 for monitoring an optical performance parameter according to the embodiments of the present invention. Moreover, the foregoing and other operations and/or functions of the modules in the apparatus 530 are separately for implementing corresponding processes of the methods in FIG. 1 to FIG. 6, which are not described herein again for brevity.

Therefore, the optical transmission system in this embodiment of the present invention performs coherent synthesis on a received to-be-detected optical signal and a multi-wavelength local oscillation laser beam, and performs corresponding signal processing to generate a continuous full power spectrum of the to-be-detected optical signal, so that an optical performance parameter of a transmission link carrying the to-be-detected optical signal can be monitored according to the continuous full power spectrum, which can prevent damage to a signal caused when a filter is used, thereby monitoring an optical performance parameter with high precision.

In addition, the terms "system" and "network" may be used interchangeably in this specification. The term "and/or" in this specification describes only an association relationship for describing associated objects and indicates that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus for monitoring an optical performance parameter, the apparatus comprising:
    a processor;
    a coherent receiving unit configured to cooperate with the processor to perform coherent synthesis on a detecting optical signal and a multi-wavelength local oscillation laser beam comprising multiple wavelengths, and convert a coherent receiving signal formed by means of the coherent synthesis into an analog electrical signal;
    a data acquiring unit configured to cooperate with the processor to acquire the analog electrical signal output by the coherent receiver, and convert the analog electrical signal into a digital signal; and
    a non-transitory, computer-readable storage medium storing a program to be executed by the processor, wherein the program including instructions to:
        process the digital signal output by the data acquiring unit, to generate a continuous full power spectrum of the optical signal;
        monitor, according to the continuous full power spectrum, an optical performance parameter of a transmission link carrying the detecting optical signal;
        perform Fourier transformation on the digital signal output by the data acquiring unit to generate continuous power spectra in multiple different frequency bands corresponding to the multi-wavelength local oscillation laser beam of the detecting optical signal;
        generate a discrete full power spectrum of the detecting optical signal according to the continuous power spectra in the multiple different frequency bands; and
        generate the continuous full power spectrum of the detecting optical signal according to the discrete full power spectrum of the detecting optical signal by using an interpolation algorithm.

2. The apparatus according to claim 1, wherein the coherent receiving unit comprises:
    a multi-wavelength local oscillation laser configured to output the multi-wavelength local oscillation laser beam;
    a first optical synthesizer configured to perform coherent synthesis on a first optical signal that has a first polarization state and that is in the detecting optical signal and a first local oscillation laser beam that has the first polarization state and that is in the multi-wavelength local oscillation laser beam; and
    a first optoelectronic detector configured to receive the coherent receiving signal generated after the first optical synthesizer performs the coherent synthesis, and convert the coherent receiving signal into the analog electrical signal.

3. The apparatus according to claim 2, wherein the coherent receiving unit further comprises:
    a polarization controller configured to adjust a polarization state of the detecting optical signal;
    a first polarization beam splitter configured to divide, into the first optical signal and a second optical signal whose polarization states are perpendicular to each other, the detecting optical signal output by the polarization controller, wherein the first optical signal is input to the first optical synthesizer; and
    a second polarization beam splitter configured to divide, into the first local oscillation laser beam and a second local oscillation laser beam whose polarization states are perpendicular to each other, the multi-wavelength local oscillation laser beam that is output by the multi-wavelength local oscillation laser, wherein the first local oscillation laser beam is input to the first optical synthesizer.

4. The apparatus according to claim 3, wherein the coherent receiving unit further comprises:
    a second optical synthesizer configured to receive the second optical signal that has a second polarization state and the second local oscillation laser beam that has the second polarization state, and perform coherent synthesis on the second optical signal and the second local oscillation laser beam, wherein the second polarization state is perpendicular to the first polarization state; and
    a second optoelectronic detector configured to receive the coherent receiving signal generated after the second optical synthesizer performs the coherent synthesis, and convert the coherent receiving signal into the analog electrical signal.

5. The apparatus according to claim 1, wherein the program including instructions to:
    perform averaging processing on multiple digital signals that are output by the data acquiring unit and that are in a same frequency band; and
    perform Fourier transformation on the multiple digital signals on which the averaging processing has been performed, to generate a continuous power spectrum, in the same frequency band corresponding to the multi-wavelength local oscillation laser beam, of the detecting optical signal.

6. The apparatus according to claim 2, wherein the multi-wavelength local oscillation laser is a tunable laser, and a wavelength of a laser beam that is output by the tunable laser comprises a wavelength of the detecting optical signal.

7. The apparatus according to claim 2, wherein the multi-wavelength local oscillation laser is an optical frequency comb; and
the coherent receiver further comprises a band-pass filter (BPF), configured to perform filtering on the multi-wavelength local oscillation laser beam that is output by the optical frequency comb, wherein a frequency of the detecting optical signal is within a range of cut-off frequencies of the band-pass filter.

8. The apparatus according to claim 4, wherein the first optical synthesizer or the second optical synthesizer is an optical hybrid, and a bandwidth of the first optoelectronic detector or the second optoelectronic detector is within a range of 500Megahertz (MHz) to 2 Gigahertz (GHz).

9. The apparatus according to claim 4, wherein the first optical synthesizer or the second optical synthesizer is an optical coupler.

10. The apparatus according to claim 1, wherein the optical performance parameter comprises at least one parameter of following parameters:
an optical signal-to-noise ratio (OSNR),
optical power,
a modulation format,
a channel wavelength shift,
amplified spontaneous emission (ASE) noise,
an amplifier gain, and
a gain tilt.

11. An optical transmission system comprising:
a fiber link configured to transmit an optical signal;
an optical splitter disposed in the fiber link, and configured to divide the optical signal into a first optical signal and a second optical signal, wherein a strength of the first optical signal is greater than a strength of the second optical signal; and
the apparatus for monitoring an optical performance parameter according to claim 1, configured to receive the second optical signal output by the optical splitter, and monitor an optical performance parameter of the second optical signal.

12. A method for monitoring an optical performance parameter, the method comprising:
performing coherent synthesis on a detecting optical signal and a multi-wavelength local oscillation laser beam comprising multiple wavelengths;
converting a coherent receiving signal formed by means of the coherent synthesis into an analog electrical signal;
acquiring the analog electrical signal, and converting the analog electrical signal into a digital signal;
processing the digital signal to generate a continuous full power spectrum of the detecting optical signal, including
performing Fourier transformation on the digital signal to generate continuous power spectra in multiple different frequency bands corresponding to the multi-wavelength local oscillation laser beam of the detecting optical signal,
generating a discrete full power spectrum of the detecting optical signal according to the continuous power spectra in the multiple different frequency bands, and
generating the continuous full power spectrum of the detecting optical signal according to the discrete full power spectrum of the detecting optical signal by using an interpolation algorithm; and
monitoring, according to the continuous full power spectrum, an optical performance parameter of a transmission link carrying the detecting optical signal.

13. The method according to claim 12, wherein the performing of the coherent synthesis on the detecting optical signal and the multi-wavelength local oscillation laser beam comprises:
performing the coherent synthesis on a first optical signal that has a first polarization state and that is in the detecting optical signal and a first local oscillation laser beam that has the first polarization state and that is in the multi-wavelength local oscillation laser beam.

14. The method according to claim 13, wherein before the performing of the coherent synthesis on the detecting optical signal and the multi-wavelength local oscillation laser beam, the method further comprises:
adjusting a polarization state of the detecting optical signal;
dividing, into the first optical signal and a second optical signal whose polarization states are perpendicular to each other, the detecting optical signal whose polarization state is adjusted; and
dividing the multi-wavelength local oscillation laser beam into the first local oscillation laser beam and a second local oscillation laser beam whose polarization states are perpendicular to each other,
wherein performing coherent synthesis on the detecting optical signal and the multi-wavelength local oscillation laser beam further comprises performing the coherent synthesis on the first optical signal and the first local oscillation laser beam.

15. The method according to claim 14, wherein the performing of the coherent synthesis on the detecting optical signal and the multi-wavelength local oscillation laser beam comprises:
performing the coherent synthesis on the first optical signal and the first local oscillation laser beam; and
performing the coherent synthesis on the second optical signal that has a second polarization state and the second local oscillation laser beam that has the second polarization state, wherein the second polarization state is perpendicular to the first polarization state.

16. A non-transitory computer-readable storage medium having a program recorded thereon, wherein the program, when executed by a computer, causes the computer to provide at least the following operations:
perform coherent synthesis on a detecting optical signal and a multi-wavelength local oscillation laser beam comprising multiple wavelengths;
convert a coherent receiving signal formed by means of the coherent synthesis into an analog electrical signal;
acquire the analog electrical signal, and converting the analog electrical signal into a digital signal;
process the digital signal to generate a continuous full power spectrum of the detecting optical signal, including
perform Fourier transformation on the digital signal to generate continuous power spectra in multiple different frequency bands corresponding to the multi-wavelength local oscillation laser beam of the detecting optical signal, generate a discrete full power spectrum of the detecting optical signal according to the continuous power spectra in the multiple different frequency bands, and generate the continuous full power spectrum of the detecting optical signal according to the discrete full power spectrum of the detecting optical signal by using an interpolation algorithm; and monitor, according to the continuous full power spectrum, an optical performance parameter of a transmission link carrying the detecting optical signal.

17. The non-transitory computer-readable storage medium according to claim 16, wherein performing coherent synthesis on the detecting optical signal and the multi-wavelength local oscillation laser beam comprises:

perform the coherent synthesis on a first optical signal that has a first polarization state and that is in the detecting optical signal, and a first local oscillation laser beam has the first polarization state and is in the multi-wavelength local oscillation laser beam.

18. The non-transitory computer-readable storage medium according to claim 16, wherein before performing coherent synthesis on the detecting optical signal and the multi-wavelength local oscillation laser beam, the operations further comprise:

adjust a polarization state of the detecting optical signal;

divide, into the first optical signal and a second optical signal whose polarization states are perpendicular to each other, the detecting optical signal whose polarization state is adjusted; and dividing the multi-wavelength local oscillation laser beam into the first local oscillation laser beam and a second local oscillation laser beam whose polarization states are perpendicular to each other, wherein performing coherent synthesis on the detecting optical signal and the multi-wavelength local oscillation laser beam further comprises performing the coherent synthesis on the first optical signal and the first local oscillation laser beam.

* * * * *